US012321008B2

(12) United States Patent
Neumann et al.

(10) Patent No.: US 12,321,008 B2
(45) Date of Patent: Jun. 3, 2025

(54) MULTI-CHIP MODULE AND METHOD

(71) Applicant: Technische Universitat Dresden, Dresden (DE)

(72) Inventors: Niels Neumann, Dresden (DE); Sujay Ashok Charania, Dresden (DE); Dirk Plettemeier, Dresden (DE); Nektarios Koukourakis, Freital (DE); Stefan Rothe, Dresden (DE); Jurgen Czarske, Dresden (DE)

(73) Assignee: TECHNISCHE UNIVERSITAT DRESDEN (DE)

( * ) Notice: Subject to any disclaimer, the term of this patent is extended or adjusted under 35 U.S.C. 154(b) by 248 days.

(21) Appl. No.: 18/051,604

(22) Filed: Nov. 1, 2022

(65) Prior Publication Data

US 2023/0145821 A1 May 11, 2023

(30) Foreign Application Priority Data

Nov. 5, 2021 (DE) ...................... 10 2021 128 862.0

(51) Int. Cl.
*G02B 6/12* (2006.01)
*G02B 6/43* (2006.01)
(Continued)

(52) U.S. Cl.
CPC ................. *G02B 6/12* (2013.01); *G02B 6/43* (2013.01); *H04B 1/0483* (2013.01);
(Continued)

(58) Field of Classification Search
CPC .... G02B 6/12; G02B 6/43; G02B 2006/1209; H04B 1/0483; H04B 10/2581; H04B 10/801

See application file for complete search history.

(56) References Cited

U.S. PATENT DOCUMENTS 5,600,470 A * 2/1997 Walsh ................ H04B 10/2581
398/139
11,041,999 B2 * 6/2021 Winzer ................ G02B 6/4274
(Continued)

OTHER PUBLICATIONS

S. Charania et al. "Design, Fabrication, and Comparison of 3D Multimode Optical Interconnects on Silicon Interposer", Journal of Lightwave Technology, 2020.
(Continued)

*Primary Examiner* — Daniel Petkovsek
(74) *Attorney, Agent, or Firm* — Barnes & Thornburg LLP; Jeffrey R. Stone

(57) ABSTRACT

In a multi-chip module and method, the multi-chip module includes a carrier; a multimode optical waveguide formed on and/or in the carrier; a first and second chip disposed on the carrier and coupled to the multimode optical waveguide; wherein the first chip is configured to transmit light beams into the multimode optical waveguide; the multimode optical waveguide is configured to generate mixed light beams that are an at least partial superposition of the light beams; the second chip is configured to receive the mixed light beams from the multimode optical waveguide; and the second chip is configured to store a representation of the received mixed light beams as a transmission signature and/or as a cryptographic key in a memory associated with the second chip, and/or compare the representation of the received mixed light beams with a target representation stored in the memory associated with the second chip.

15 Claims, 18 Drawing Sheets

(51) Int. Cl.
*H04B 1/04* (2006.01)
*H04B 10/2581* (2013.01)
*H04B 10/80* (2013.01)

(52) U.S. Cl.
CPC ....... *H04B 10/2581* (2013.01); *H04B 10/801* (2013.01); *G02B 2006/1209* (2013.01)

(56) References Cited

U.S. PATENT DOCUMENTS

| | | | |
|---|---|---|---|
| 11,538,758 B2 * | 12/2022 | Dogiamis | H01L 23/66 |
| 2006/0083461 A1 * | 4/2006 | Takahashi | G02B 6/1228 |
| | | | 385/24 |
| 2007/0092176 A1 | 4/2007 | Murphy et al. | |
| 2010/0027947 A1 * | 2/2010 | Dutta | G02B 6/4257 |
| | | | 264/1.25 |
| 2016/0142142 A1 * | 5/2016 | Ryf | G02B 6/14 |
| | | | 398/55 |
| 2017/0093503 A1 | 3/2017 | Winzer et al. | |
| 2021/0208337 A1 * | 7/2021 | Pezeshki | G02B 6/43 |

OTHER PUBLICATIONS

S. Rothe et al. "Physical Layer Security in Multimode Fiber Optical Networks", Scientific Reports, 2020.

\* cited by examiner

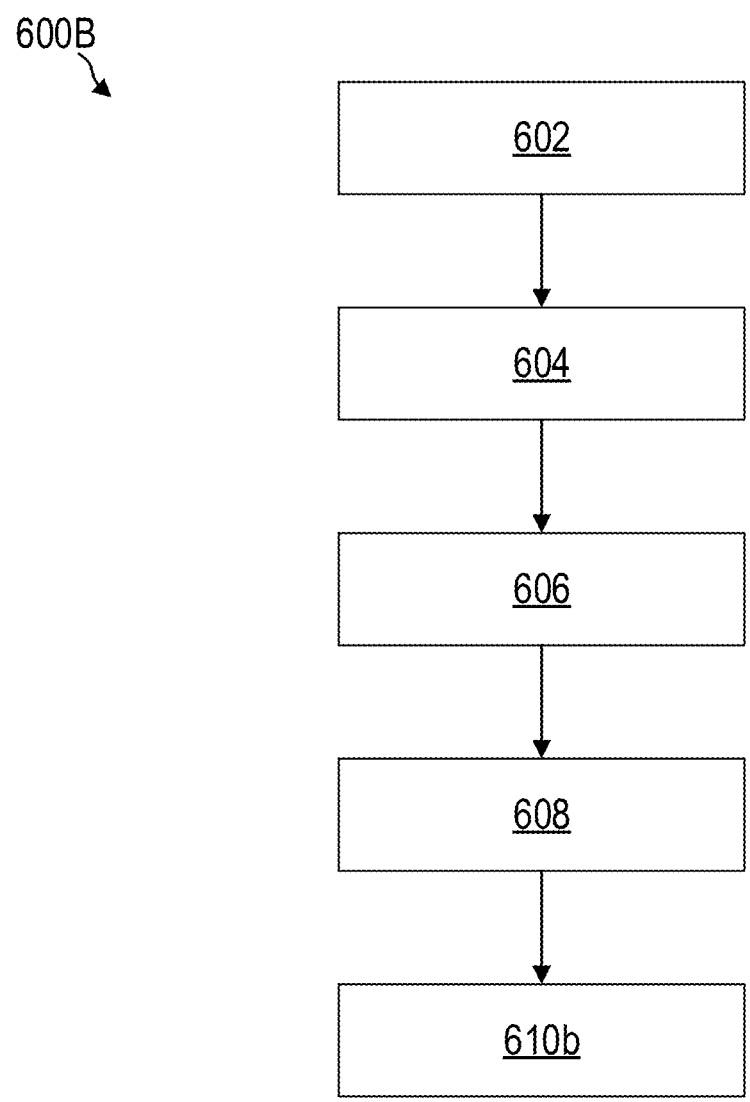

MULTI-CHIP MODULE AND METHOD

CROSS-REFERENCE TO RELATED APPLICATIONS

This application claims priority to German Application DE 10 2021 128 862.2, which was filed on Nov. 5, 2021, the entire contents of which are incorporated by reference herein.

TECHNICAL FIELD

Various embodiments relate to a multi-chip module and a method (e.g., a method for checking the integrity of data transmitted in a multi-chip module and/or for generating a transmission signature and/or for generating a cryptographic key in the multi-chip module).

BACKGROUND

Trustworthy electronics may be necessary for safety-critical applications, such as autonomous driving and/or medical technology. For such trustworthy electronics, encapsulation of components of a multi-chip module is not sufficient. Also, it is not always possible to monolithically integrate all functions into a single chip. On the other hand, the respective chips could have a cryptographic key and the communication between the chips could be encrypted. However, this cryptographic key cannot be easily updated if it becomes known.

Several chips can be arranged, and may communicate with each other, on a multi-chip module. For this purpose, electrical conductors (e.g. made of copper) can connect these chips with each other. In this context, it may be necessary to ensure the integrity of received data, i.e. to ensure that the data has not been manipulated (e.g. falsified). Furthermore, it may also be necessary to ensure confidentiality of transmitted data, so that the transmitted data cannot be tapped by unauthorized third parties.

SUMMARY

In light of the foregoing, it may be necessary to provide a multi-chip module and a related method that ensure both integrity of data and confidentiality of data when communicating between chips within the same multi-chip module.

According to various embodiments, a multi-chip module and method are provided for ensuring both integrity and confidentiality of transmitted data. The multi-chip module and method further enable cryptography in which the cryptographic key can be updated in a comparatively simple manner A symmetric key can also be generated without key exchange.

BRIEF DESCRIPTION OF THE FIGURES

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which:

FIGS. 6A and 6B depict a method according to various embodiments.

DETAILED DESCRIPTION

Figure 1A:
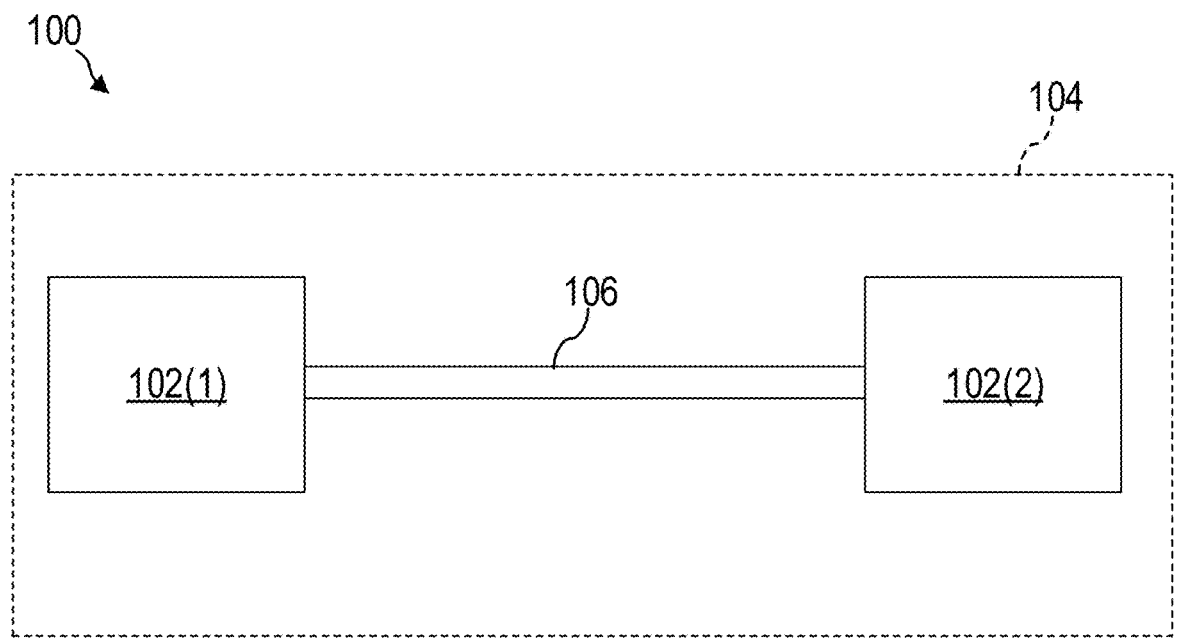
FIGS. 1A to 1G depict a multi-chip module according to various embodiments.

For this purpose, the multi-chip module has an optical multimode waveguide which is arranged (e.g. formed) on and/or in a carrier of the multi-chip module. The mode mixing of transmitted 5 light of different light modes caused by the optical multimode waveguide prevents the data from being tapped at any location of the optical multimode waveguide. Thus, the mode distribution at two different locations of the multimode optical waveguide (i.e., the transmission channel) is different (i.e., location-variant). Also, coupling and/or decoupling light from the multimode optical waveguide leads to a detectable change in the mode distribution. Illustratively, a security of the physical layer is provided in this way.

This is not possible, for example, with multimode optical fibers, which can be used for data transmission between separate chip modules. For example, multimode fibers do not provide long-term stability because environmental influences (e.g., bending of the fiber, stresses, a temperature, etc.) change the transmission characteristics of the multimode optical fiber. The inventors have recognized that multimode optical waveguides formed on and/or in a carrier of the multi-chip module have the required long-term stability, and that for multimode optical waveguides less than 1 cm in length, and even for multimode optical waveguides less than 1 mm in length, there is such a degree of mode mixing that it can be used to provide physical layer security. Further, the inventors have recognized that even when multiple multimode optical waveguides are manufactured in a common process (e.g., lithography), the variations due to the process (e.g., manufacturing tolerances) as well as the tolerances in coupling the chips to the multimode optical waveguides result in the multimode optical waveguides having different transmission characteristics (i.e., mode mixing).

Furthermore, optical data transmission by means of the optical multimode waveguide enables significantly higher data rates compared to electrical data transmission by means of electrical conductor paths (e.g. formed from copper), which increases the efficiency of data transmission.

Consequently, the multi-chip module and method provide efficient data transmission between chips of the multi-chip module with high confidentiality and integrity. The confidentiality and integrity can be ensured by means of a transmission signature and/or a cryptographic key determined based on the transmission properties.

The multi-chip module having the features of independent claim 1 forms a first example.

Each light beam of the plurality of light beams may have an associated light mode of a plurality of light modes. The features described in this paragraph in combination with the first example form a second example.

The second chip may be configured to confirm the integrity of data represented by the plurality of light beams when the representation of the received plurality of mixed light beams matches the target representation. The features described in this paragraph in combination with the first example or the second example form a third example.

The multimode optical waveguide may be arranged such that a number of light modes that can be transmitted by means of the multimode optical waveguide is less than or equal to ten. The features described in this paragraph in combination with one or more of the first example to the third example form a fourth example.

The second chip may be configured to determine transmission characteristics (e.g., as a transmission matrix) of the multimode optical waveguide as a representation of the received plurality of mixed light beams using the received plurality of mixed light beams. The features described in this paragraph in combination with one or more of the first example to the fourth example form a fifth example.

The second chip may be configured to detect the received plurality of mixed light beams as a light intensity pattern, wherein the detected light intensity pattern may be a representation of the received plurality of mixed light beams. The features described in this paragraph in combination with one or more of the first example to the fifth example form a sixth example.

The first chip may be configured to transmit, for each wavelength of the plurality of wavelengths, a respective plurality of light beams into the multimode optical waveguide. The second chip may be arranged, for each wavelength of the plurality of wavelengths: to receive a respective plurality of mixed light beams from the multimode optical waveguide, and to store a respective representation or a common representation of the received plurality of mixed light beams and/or compare them to a respective or common target representation. The features described in this paragraph in combination with one or more of the first example through the sixth example form a seventh example.

The second chip may be configured to determine, for each received plurality of mixed light beams, respective transmission characteristics of the multimode optical waveguide of the received plurality of mixed light beams, wherein the respective transmission characteristics may be the respective representation of the received plurality of mixed light beams, or wherein the representation may be determined using all of the determined transmission characteristics. The features described in this paragraph in combination with the seventh example form an eighth example.

The second chip may be configured to detect, for each received plurality of mixed light beams, a respective light intensity pattern, which may be the respective representation of the received plurality of mixed light beams, or wherein the representation may be determined using the light intensity patterns. The features described in this paragraph in combination with the seventh example or the eighth example form a ninth example.

The plurality of light beams may be a first plurality of light beams, and the plurality of mixed light beams may be a first plurality of mixed light beams. The second chip may be configured to transmit a second plurality of light beams into the multimode optical waveguide. The multimode optical waveguide may be configured to generate a second plurality of mixed light beams including an at least partial superposition (e.g. overlay, overlapping) of the second plurality of light beams. The first chip may be configured to receive the second plurality of mixed light beams from the multimode optical waveguide. The first chip may be configured to store a representation of the received second plurality of mixed light beams in a memory associated with the first chip. The features described in this paragraph in combination with one or more of the first example through the ninth example form a tenth example.

Each light beam of the second plurality of light beams may be associated with a light beam of the first plurality of light beams and have the same wavelength as the associated light beam. The second chip may be configured to determine, using the received first plurality of mixed light beams, the cryptographic key as a representation of the received first plurality of mixed light beams. The first chip may be configured to determine, using the received second plurality of mixed light beams, the cryptographic key as a representation of the received second plurality of mixed light beams. The features described in this paragraph in combination with the tenth example form an eleventh example.

The second chip may be configured to determine transmission characteristics of the multimode optical waveguide using the received first plurality of mixed light beams and to determine the cryptographic key using the determined transmission characteristics. The first chip may be configured to determine transmission characteristics of the multimode optical waveguide using the received second plurality of mixed light beams, and to determine the cryptographic key using the determined transmission characteristics. The features described in this paragraph in combination with the eleventh example form a twelfth example.

The second chip may be configured to detect the received first plurality of mixed light beams as a first light intensity pattern and to determine the cryptographic key using the detected first light intensity pattern. The first chip may be configured to detect the received second plurality of mixed light beams as a second light intensity pattern and to determine the cryptographic key using the detected second light intensity pattern. The features described in this paragraph in combination with the eleventh example or the twelfth example form a thirteenth example.

The first chip may be configured to transmit, for each wavelength of the plurality of wavelengths, a respective first plurality of light beams into the multimode optical waveguide. The second chip may be configured to receive, for each wavelength of the plurality of wavelengths, a respective first plurality of mixed light beams from the multimode optical waveguide and to determine the cryptographic key using each received first plurality of mixed light beams. The features described in this paragraph in combination with one or more of the eleventh example through the thirteenth example form a fourteenth example.

The second chip may be configured to determine, for each received first plurality of mixed light beams, respective transmission characteristics of the multimode optical waveguide and to determine the cryptographic key using any determined transmission characteristics. The first chip may be configured to determine, for each received second plurality of mixed light beams, respective transmission characteristics of the multimode optical waveguide and to determine the cryptographic key using any of the determined transmission characteristics. The features described in this paragraph in combination with the fourteenth example form a fifteenth example.

The second chip may be configured to detect a respective first light intensity pattern for each received first plurality of mixed light beams and to determine the cryptographic key using the detected first light intensity patterns. The first chip may be configured to detect a respective second light intensity pattern for each received second plurality of mixed light beams, and to determine the cryptographic key using the detected second light intensity patterns. The features described in this paragraph in combination with the fourteenth example or the fifteenth example form a sixteenth example.

The first chip may be configured to encrypt data using the determined cryptographic key. Optionally, the first chip may be configured to transmit the encrypted data to the second chip using the multimode optical waveguide. The features described in this paragraph in combination with one or more of the eleventh example through the sixteenth example form a seventeenth example.

The second chip may be configured to encrypt data using the determined cryptographic key. Optionally, the second chip may be configured to transmit the encrypted data to the first chip using the multimode optical waveguide. The features described in this paragraph in combination with one or more of the eleventh example through the seventeenth example form an eighteenth example.

A method may include: transmitting a plurality of light beams from a first chip into a multimode optical waveguide formed on and/or in a carrier; generating a plurality of mixed light beams including an at least partial superposition of the plurality of light beams by the multimode optical waveguide; receiving the plurality of mixed light beams by the second chip, wherein the first chip and the second chip are arranged on a carrier; determining a representation of the received plurality of mixed light beams; and (i) storing the representation of the received plurality of mixed light beams as a transmission signature and/or a cryptographic key in a memory associated with the second chip, and/or (ii) comparing the representation of the received plurality of mixed light beams with a target representation stored in the memory associated with the second chip. The method having the features described in this paragraph forms a nineteenth example.

The method may further include: if the comparison indicates that the representation of the received plurality of mixed light beams corresponds to the target representation, confirming the integrity of data representing the plurality of light beams. The features described in this paragraph in combination with the nineteenth example form a twentieth example.

Determining the representation of the received plurality of mixed light beams may include: Determining transmission characteristics of the multimode optical waveguide using the received plurality of mixed light beams. The features described in this paragraph in combination with the nineteenth example or the twentieth example form a twenty-first example.

Determining the representation of the received plurality of mixed light beams may include: Detecting the received plurality of mixed light rays as a light intensity pattern, wherein the detected light intensity pattern is the representation of the received plurality of mixed light rays. The features described in this paragraph in combination with one or more of the nineteenth example through the twenty-first example form a twenty-second example.

Determining the representation of the received plurality of mixed light beams may include: Determining the cryptographic key with the second chip, using the received plurality of mixed light beams. The features described in this paragraph in combination with the nineteenth example form a twenty-third example.

Determining the cryptographic key may include: Determining transmission characteristics of the multimode optical waveguide using the received plurality of mixed light beams; and determining the cryptographic key using the determined transmission characteristics. The features described in this paragraph in combination with the twenty-third example form a twenty-fourth example.

Determining the cryptographic key may include: detecting the received plurality of mixed light beams as a light intensity pattern, and determining the cryptographic key using the detected light intensity pattern. The features described in this paragraph in combination with the twenty-third example or the twenty-fourth example form a twenty-fifth example.

A non-transitory computer-readable medium (e.g., a computer program product, a nonvolatile storage medium, a nontransitory storage medium, a nonvolatile storage medium) may store instructions that, when executed by a processor, cause the processor to perform a method according to one or more of the first example through the twenty-fifth example. The computer-readable medium having the features described in this paragraph forms a twenty-sixth example.

In the following detailed description, reference is made to the accompanying drawings which form a part thereof and in which are shown, by way of illustration, specific embodiments in which the invention may be practiced.

The term "processor" may be understood as any type of entity that allows processing of data or signals. For example, the data or signals may be handled according to at least one (i.e., one or more than one) specific function performed by the processor. A processor may include or be formed from an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be performed (e.g., implemented) by a processor, through one or more specific functions performed by the processor. The processor may therefore be configured to perform any of the information processing methods or components thereof described herein.

Attackers can use various methods to tap and/or manipulate data transmitted in a multi-chip module. For safety-critical applications, such as autonomous driving and/or medical technology, it may be necessary both to prevent tapping of data (i.e. to ensure data confidentiality) and to detect manipulated data (i.e. to provide security against manipulation). Various embodiments relate to a multi-chip module and a method therefor by means of which both the confidentiality of transmitted data and the integrity of received data can be ensured, in that the data are transmitted by means of a multimode optical waveguide formed on and/or in a carrier of the multi-chip module, and the transmission characteristics of the multimode optical waveguide are used for checking the integrity and/or encryption of the data.

FIG. 1A illustrates a multi-chip module 100 according to various embodiments. The multi-chip module 100 may include a first component and a second component. For illustrative purposes, the concept is described below for communication between chips of a multi-chip module. For example, the multi-chip module 100 may include a first chip 102(1) and a second chip 102(2). It will be understood that the concept described herein may be used analogously for communication between any components of a multi-chip module (e.g., between a chip and a memory, between a sensor and a chip, between a sensor and a memory, between a chip, sensor, or memory and another component of the multi-chip module, etc.).

The multi-chip module 100 may include a carrier 104. The first chip 102(1) and the second chip 102(2) may be disposed on the carrier 104. The carrier 104 may be any type of carrier suitable for use as a carrier for components of a multi-chip module. For example, the carrier 104 may be a printed circuit board. For example, the carrier 104 may be an interposer. For example, an embodiment of the carrier 104 as an interposer may increase an integration density of the multi-chip module 100. The carrier 104 may be formed of or include any suitable material for this purpose, such as silicon, glass, (e.g., fiber-reinforced) plastic, hard paper, etc. The first chip 102(1) and the second chip 102(2) may be disposed on the same side of the carrier 104 or on different (e.g., opposite) sides of the carrier 104. According to various embodiments, the carrier 104 may include multiple (e.g., stacked) interposers.

The multi-chip module 100 may include a multimode optical waveguide 106. The multimode optical waveguide 106 may be disposed (e.g., formed) on and/or within the carrier 104. The multimode optical waveguide 106 may be formed on and/or in the carrier 104 using lithography, printing, or photonic wire bonding, etc. The multimode optical waveguide 106 may have one or more horizontal sections and/or one or more vertical sections. In this regard, the directional terminology "horizontal" and "vertical" may refer to a surface of the carrier 104, such that "horizontal" may indicate a substantially parallel path to the surface of the carrier 104 and "vertical" may indicate a substantially perpendicular path to the surface of the carrier 104. For example, the first chip 102(1) and the second chip 102(2) may be disposed on the same side of the carrier 104 and the multimode optical waveguide 106 may be disposed (e.g., by means of one or more horizontal sections) on the carrier 104. For example, the first chip 102(1) and the second chip 102(2) may be disposed on opposite sides of the carrier 104 and the multimode optical waveguide 106 may be disposed (e.g., by means of one or more vertical sections) in the carrier 104 and optionally may also be disposed in one or more sections on the carrier 104.

The multimode optical waveguide 106 may be coupled (e.g., connected) to the first chip 102(1) and the second chip 102(2) to enable communication between the first chip 102(1) and the second chip 102(2) using the multimode optical waveguide 106.

The first chip 102(1) may be configured to transmit a plurality of light beams into the multimode optical waveguide 106. The second chip 102(2) may be configured to transmit a plurality of light beams into the multimode optical waveguide 106. The multimode optical waveguide 106 may be configured to transmit a plurality of light beams each having a respective light mode. Illustratively, the multimode optical waveguide may transmit light beams having a plurality of light modes.

Each light beam of the respective plurality of light beams may have an associated light mode of a plurality of light modes (e.g., more than three modes, e.g., more than five modes, e.g., more than ten modes, e.g., more than 25 modes, e.g., more than 50 modes, e.g., more than 55 modes, e.g., in a range of 50 to 100 modes). For example, each light beam of the plurality of light beams may uniquely (e.g., bijectively) have a light mode of the plurality of light modes. A mixed light beam may have a mixture of modes. For example, each light beam of the plurality of light beams may have a light mode of the plurality of light modes, the light mode being different from the other light modes of the plurality of light modes. Each light mode of the plurality of light modes may have an associated amplitude and an associated phase (e.g., optical phase) of the respective light beam of the plurality of light beams. Illustratively, each light beam of the plurality of light beams may have an associated amplitude and an associated phase, wherein the associated amplitudes and/or the associated phases of one or more light beams of the plurality of light beams are different from those of the other light beams of the plurality of light beams. Illustratively, the light beams of the plurality of light beams may have different amplitudes and/or different phases. According to various embodiments, the plurality of light beams may have a fundamental mode. For example, a light beam of the plurality of light beams may have the fundamental mode. The phase of the fundamental mode may be equal to "0".

The multimode optical waveguide 106 may be configured to at least partially superimpose the plurality of light beams transmitted into the multimode optical waveguide 106 into a plurality of mixed light beams. Illustratively, during transmission of the light beams of different light modes through the multimode optical waveguide 106, mode mixing may occur that produces the mode-mixed light beams. A degree of mode mixing (and thus the mixed light beams) may be different at each point of the multimode optical waveguide 106.

Each of the first chip 102(1) and the second chip 102(2) may be configured to receive the plurality of light beams transmitted from the other chip into the multimode optical waveguide 106 as a plurality of mixed light beams from the multimode optical waveguide 106.

Figure 1B:
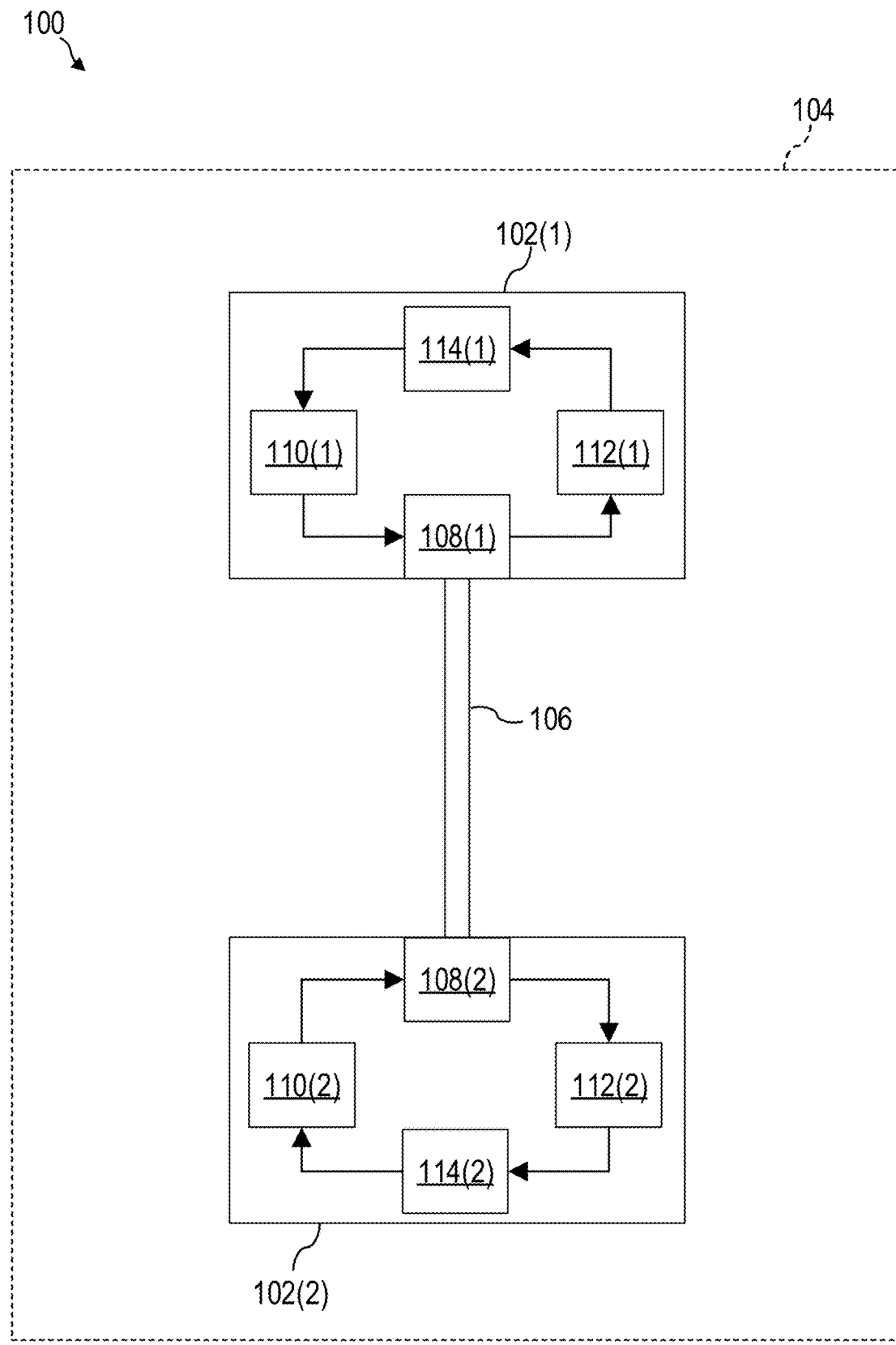

With reference to FIG. 1B, a chip 102(n) described herein (e.g., the first chip 102(n=1) and/or the second chip 102(n=2)) may include a respective waveguide interface 108(n). The respective waveguide interface 108(n) may be configured to receive at least one light beam from an optical waveguide. The respective waveguide interface 108(n) (e.g., the first waveguide interface 108(1) and/or the second waveguide interface 108(2)) may be configured to receive a plurality of mixed light beams from the multimode optical waveguide 106.

According to various embodiments, each chip 102(n) described herein (e.g., the first chip 102(1) and/or the second chip 102(2)) may include a transmit device 110(n) (e.g., the first chip 102(1) may include a first transmit device 110(1) and/or the second chip 102(2) may include a second transmit device 110(2)). The transmit device 110(n) may be configured to generate a respective plurality of (e.g., multimode) light beams and transmit them to the multimode optical waveguide 106 using the respective waveguide interface 108(n). The transmit device 110(n) may be configured to provide the plurality of light beams directly or indirectly (e.g., using one or more other optical components) to the waveguide interface 108(n). For example, the transmitting device 110(n) may include a generating device, which may be configured to generate an initial light beam. The generating device may be a vertical-cavity surface-emitting laser (VCSEL) array. The emitting device 110(n) may include a modulating device, which may be configured to generate the plurality of light beams by modulating the initial light beam.

According to various embodiments, each chip 102(n) described herein (e.g., the first chip 102(1) and/or the second chip 102(2)) may include a receiving device 112(n) (e.g., the first chip 102(1) may include a first receiving device 112(1) and/or the second chip 102(2) may include a second receiving device 112(2)). The receiving device 112(n) may be configured to receive the plurality of mixed light beams from the multimode optical waveguide 106 using the waveguide interface 108(n). The receiving device 112(n) may include an imaging device. According to various embodiments, the imaging device may include one or more cameras. For example, the imaging device may include a photodiode array. The imaging device may be configured to generate (e.g., capture) a light intensity pattern (referred to in some aspects as amplitude images) for the plurality of mixed light beams. A light intensity pattern described herein may have real-valued intensity distributions. The intensity distributions may have an intensity distribution of the mixed light beams of the plurality of mixed light beams (i.e., the light beams at least partially superimposed by means of the multimode optical waveguide 106). Illustratively, the intensity distributions may characterize the associated amplitudes of the light beams of the plurality of mixed light beams.

The transmit device 110(n) may include, for example, a photonic lantern, a VCSEL array (e.g., using a light emitting diode (LED) and/or a diode), a three-dimensionally printed waveguide, a two-photon (e.g., lithographically fabricated) waveguide, a (e.g., femto-second) laser-written waveguide, spatial light modulators, etc.

The receiving device 112(n) may include, for example, a photo diode array, a complementary metal-oxide-semiconductor (CMOS) camera, a photonic lantern, a three-dimensionally printed waveguide, a two-photon (e.g., lithographically fabricated) waveguide, a (e.g., femto-second) laser-written waveguide, etc.

The data transmissions allows for a multiple-input multi-output (MIMO) scheme capable to transmit and receive highly encrypted and secure data in two-dimensionally, three-dimensionally, and in between two-dimensionally and three-dimensionally integrated circuit formations of multi-chip modules.

According to various embodiments, each chip 102(n) described herein (e.g., the first chip 102(1) and/or the second chip 102(2)) may each include one or more processors 114(n) (e.g., the first chip 102(1) may include one or more first processors 114(1) and the second chip 102(2) may include one or more second processors 114(2)). The one or more processors 114(n) (referred to in various aspects as processor 114(n)) may include any type of logic implementing entity as described above. The processor 114(n) may implement logic using a memory device, for example, and/or may process data using the memory device (e.g., memory 150(n), see FIG. 1F).

The processor 114(n) may be configured to control the transmitting device 110(n) for generating the plurality of light beams. The processor 114(n) may be configured to receive and process a light intensity pattern detected by means of the generating device 112(n) of the respective chip 102(n) for a plurality of mixed light beams (see, for example, FIG. 2A to FIG. 3C).

Figure 1C:
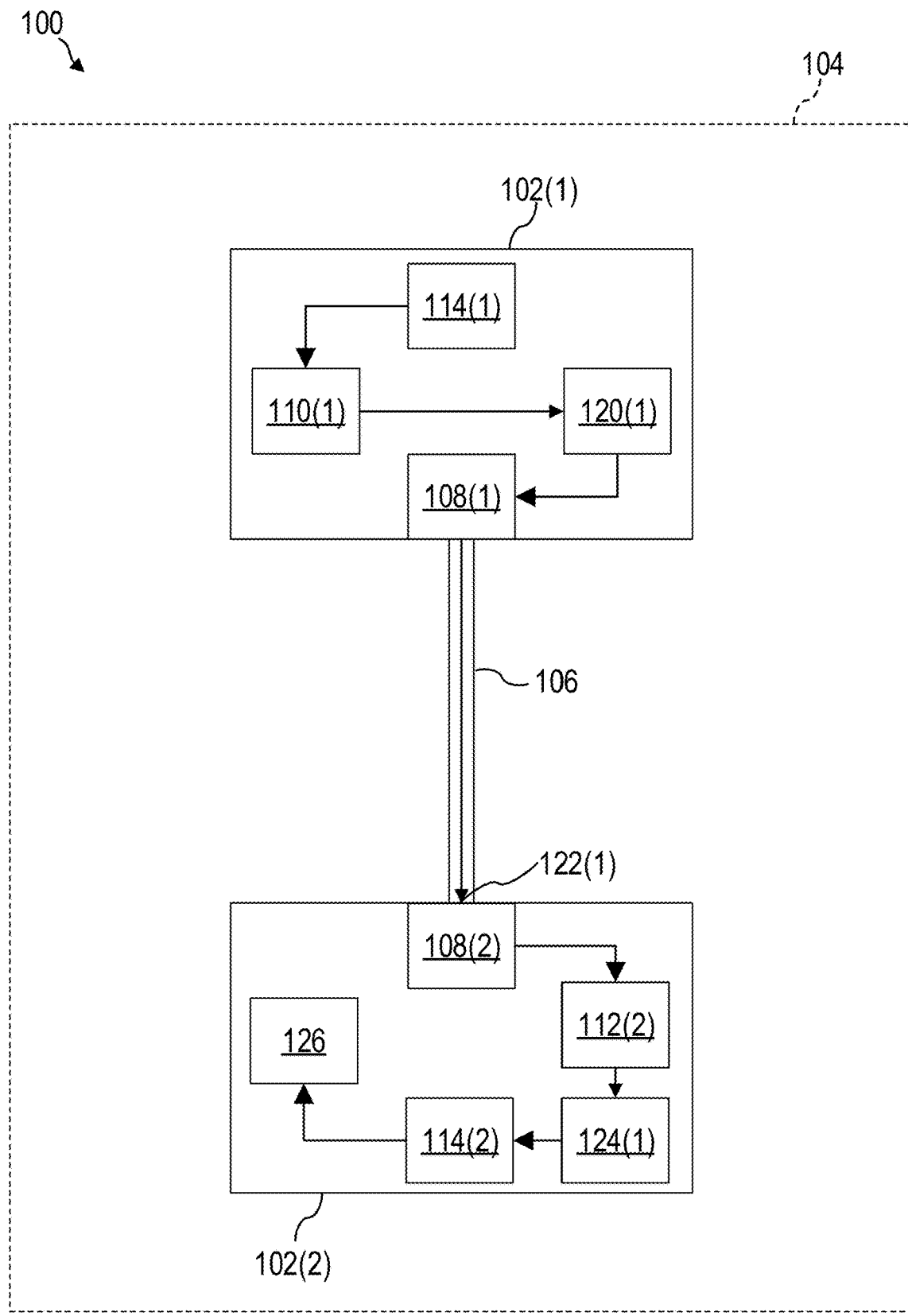

An exemplary data transfer from the first chip 102(1) to the second chip 102(2) is shown in FIG. 1C. It will be understood that the data transfer may also correspondingly occur from the second chip 102(2) to the first chip 102(1).

The first processor 114(1) may communicate instructions to the first transmitting device 110(1) for generating a first plurality of light beams. The first transmitting device 110(1) can generate the first plurality of light beams 120(1) (also referred to in some aspects as first light beams) and transmit them into the multimode optical waveguide 106 using the first waveguide interface 108(1). The light beams of the first plurality of light beams 120(1) may be multimodal, that is, each may have a light mode that is different from the light modes of the other light beams.

The multimode optical waveguide 106 may at least partially superimpose (i.e., mode mix) the first plurality of light beams 120(1) to produce a first plurality of mixed light beams 122(1).

Figure 1D:
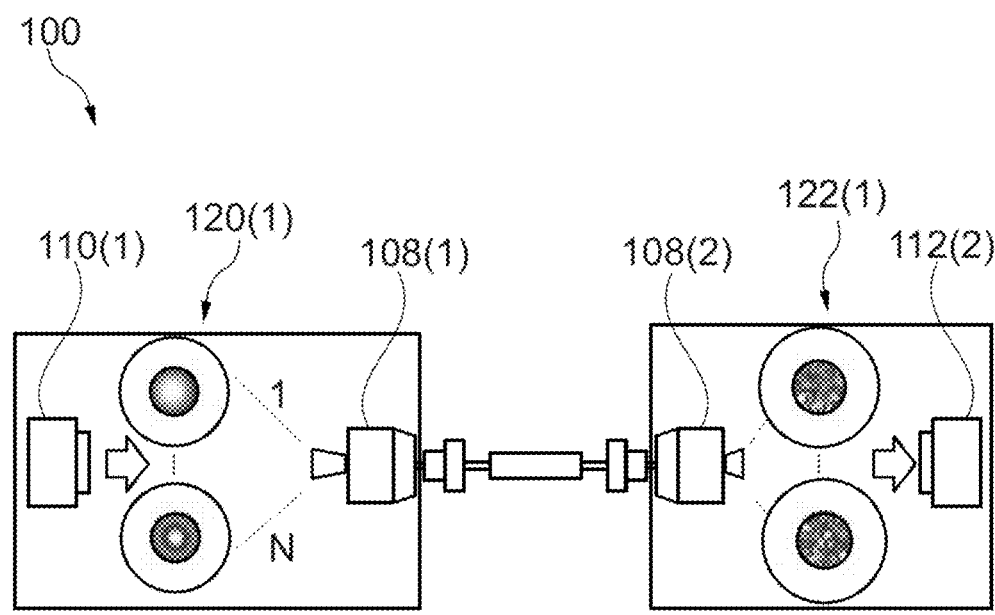

The second receiving device 112(2) may receive the first plurality of mixed light beams 122(1) (also referred to in some aspects as first mixed light beams) from the multimode optical waveguide 106 using the second waveguide interface 108(2). The second receiving device 112(2) may be configured to detect the received first plurality of mixed light beams 122(1) as a first light intensity pattern 124(1) (e.g., using one or more cameras as described herein). An exemplary illustration of transmitting the first plurality of (e.g., multimode) light beams using the multimode optical waveguide 106 is shown in FIG. 1D.

The second processor 114(2) may be configured to determine a representation 126 of the received first plurality of mixed light beams 122(1) (e.g., as a representation of the detected first light intensity pattern 124(1)).

The representation 126 may be or include a transmission signature (also referred to in some aspects as a seal) of the multimode optical waveguide 106 and/or a cryptographic key(s).

Figure 1E:
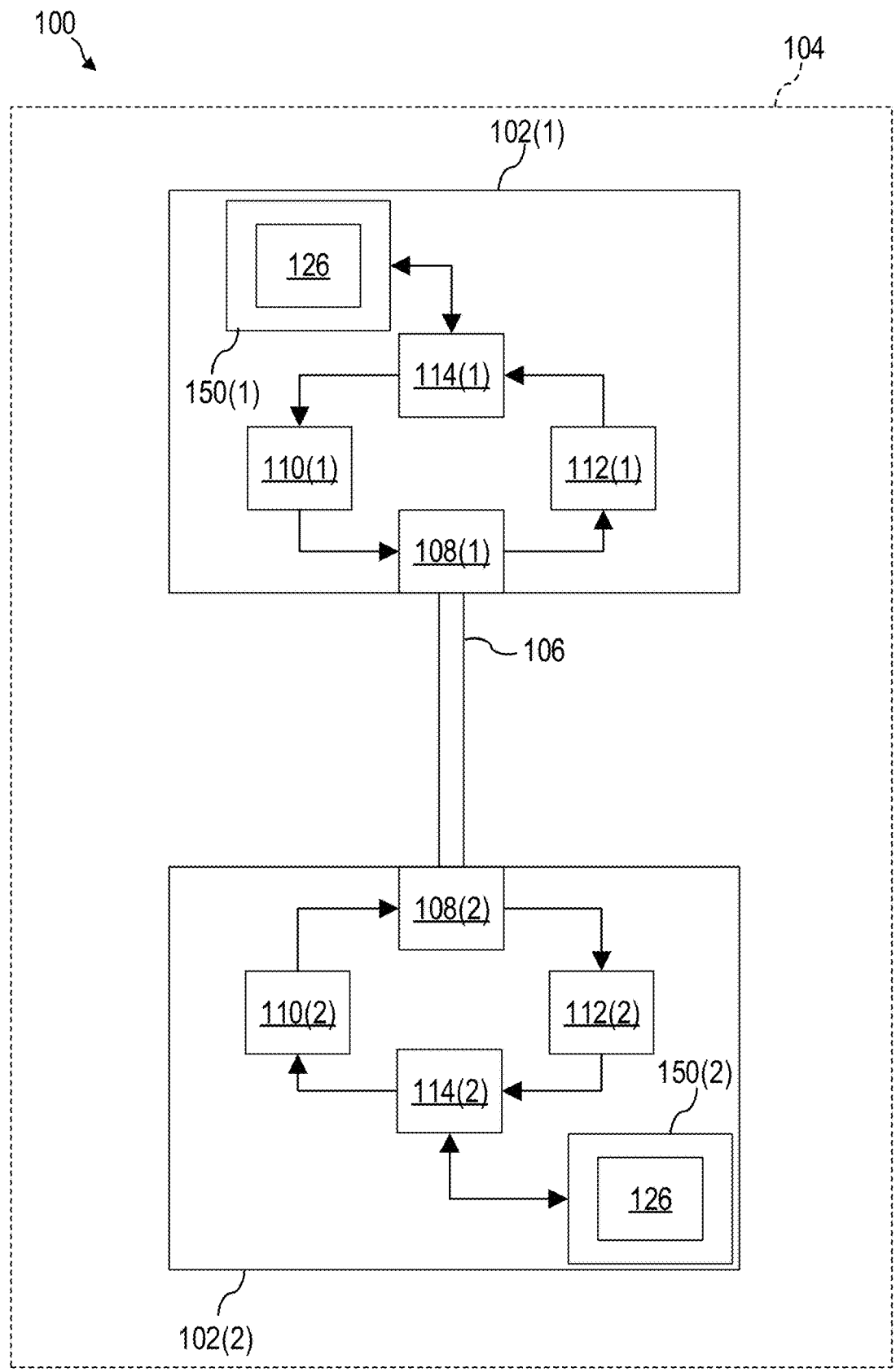

With reference to FIG. 1E, a chip 102(n) described herein may include at least one associated memory 150(n). The respective processor 114(n) may be configured to access (e.g., read and/or write) the at least one associated memory 150(n) and store the representation 126 (e.g., the transmission signature and/or the cryptographic key) in the at least one associated memory 150(n). For example, the transmission signature and the cryptographic key may be stored in the same memory or in different memories of the at least one associated memory.

A memory described herein may be a volatile memory, for example, a DRAM (dynamic random access memory), or a non-volatile memory, for example, a PROM (programmable read-only memory), an EPROM (erasable PROM), an EEPROM (electrically erasable PROM), or a flash memory, such as a floating gate memory device, a charge trapping memory device, an MRAM (magnetoresistive random access memory), or a PCRAM (phase change random access memory). According to various embodiments, the representation 126 may be or may be stored in a non-transitory memory of the at least one memory 105(n).

(I) Representation 126 as Transfer Signature

The respective chip 102(n) (e.g., the first chip 1102(1) and/or the second chip 102(2)) may be configured to determine the representation 126 as a transmission signature. The determination of the representation 126 as a transmission signature described herein may also be performed by only a single chip 120(n) (i.e., unidirectionally). It is not necessary for both chips 102(1), 102(2) to determine the transmission signature for the integrity check using the transmission signature described herein. However, the transmission characteristics of a multimode optical waveguide are reciprocal, so the first chip 1102(1) and the second chip 102(2) could determine the same transmission signature. This determined transmission signature is individual to the two chips as described herein.

Here, the transmission signature can be an initial transmission signature, which can serve as a target representation, or a target representation can already be stored in the at least one associated memory 150(n). If an initial transfer signature is stored in the memory 150(n), the determined transfer signature can be used for integrity checking.

(Ia) Representation 126 as Initial Transmission Signature.

The chip 102(n) may be configured to determine the representation 126 as an initial transmission signature. The chip 102(n) may be configured to store the initial transmission signature in the memory 150(n). In this case, the stored initial transmission signature may serve as the destination representation.

According to various embodiments, the representation 126 may be generated in a trusted environment (e.g., at the manufacturer) and stored in the memory 150(s). For example, access permissions to later modify the stored target representation may be restricted (e.g., by a password) or prevented (e.g., by using write-once memory).

As described herein, the mode mixing in the multimode optical waveguide 106 at each point of the multimode optical waveguide 106 is different (i.e., location-variant), but time-invariant. Therefore, the plurality of mixed light beams 120(n) is individual at the point where the respective chip 120(n) receives them. Any change in the region of the multimode optical waveguide 106 (e.g., a coupling and/or decoupling of light into and/or out of the multimode optical waveguide 106) results in altered transmission characteristics. The transmission characteristics depend not only on the characteristics of the multimode optical waveguide 106, but also on the spatial arrangement of the two chips with respect to the multimode optical waveguide 106. For example, even the slightest rotation of one of the two chips in space with respect to any axis will result in altered transmission characteristics. Therefore, the transmission characteristics can also be used to detect whether one of the two chips has been removed and replaced or tampered with. This leads to an additional increase in security. Illustratively, the mode mixing can seal the transmitted data and any change in the mode mixing and thus the transmission characteristics can be detected as a seal break and indicate a security breach.

According to various embodiments, the transmission characteristics may serve as an initial transmission signature. The processor 114(n) may be configured to determine transmission characteristics of the multimode optical waveguide 106 using the detected light intensity pattern 124(n). For example, the transmission characteristics of the multimode optical waveguide 106 may be determined as a transmission matrix. The transmission matrix (referred to in some aspects as a "complex-valued transmission matrix") may have, for each light beam (k) of the plurality of light beams (k=1 to K), the respective associated phase (phase$_K$) and the respective associated amplitude (amp$_K$). "K" may be the number of modes (e.g., five or more, e.g., ten or more, e.g., one hundred or more, e.g., one thousand or more). The transmission matrix may have a magnitude of K times K. Determining the transmission matrix may have or be an intensity-based mode decomposition.

According to various embodiments, the transmission characteristics may be determined during a calibration process.

Determining the transmission characteristics of the multimode optical waveguide 106 may be computationally expensive. To reduce a computational cost, the multimode optical waveguide 106 may be arranged such that a number of light modes that can be transmitted by means of the multimode optical waveguide 106 is less than or equal to ten. On the one hand, this can reduce the computational effort for determining the transmission characteristics of the multimode optical waveguide 106, and further enable a high degree of individuality and thus security of the initial transmission signature.

These transmission characteristics may be stored in the memory 150(n) as an initial transmission signature and serve as a destination representation. As described, the transmission characteristics of the multimode optical waveguide 106 are individual to the configuration of the multimode optical waveguide 106, the first chip 102(1), and the second chip 102(2), so that any subsequent change in this configuration can be captured by comparison with the stored initial transmission signature.

As described above, determining the transmission characteristics can be computationally expensive (e.g., for multimode optical waveguides that can transmit more than ten light modes). However, the complexity of the transmission matrix increases with the number of light modes, which can increase a certainty.

Figure 4A:
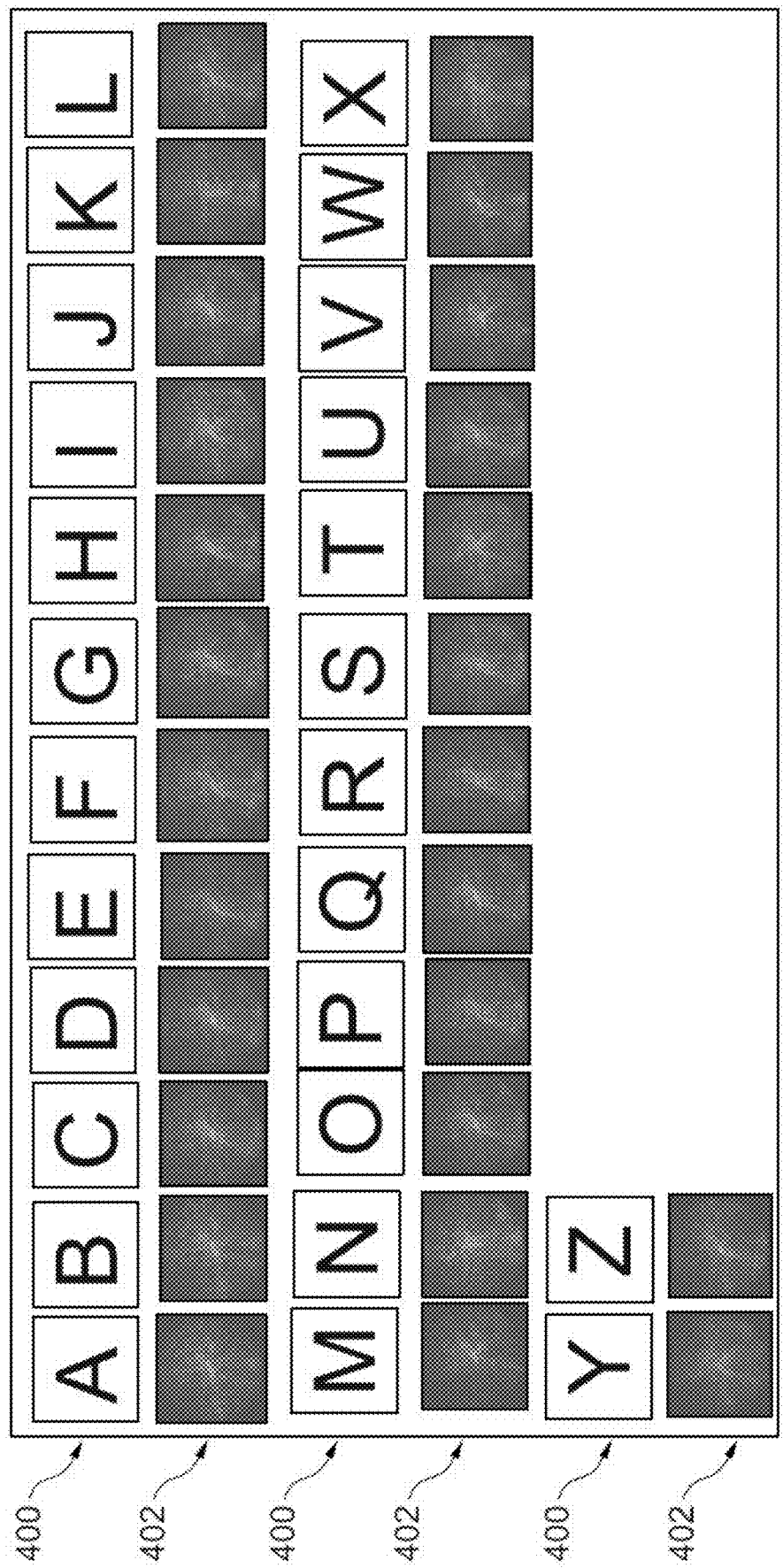
FIGS. 4A and 4B depict captured light intensity patterns from two different multimode optical waveguides for the same excitation distribution according to different embodiments.
Figure 4B:
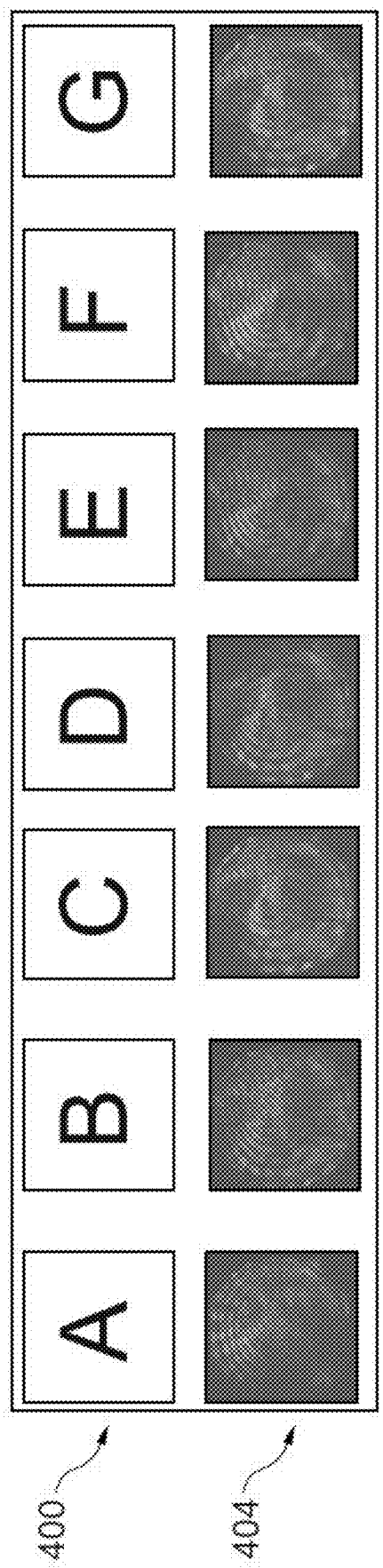

According to various embodiments, the detected light intensity pattern 124(n) may directly serve as a target representation. If a plurality of light beams 120(n±1) with predefined characteristics are transmitted, the light intensity pattern 124(n) detected therefor may be individual to the transmission characteristics. Illustratively, the detected light intensity pattern 124(n) may serve as an initial transmission signature. An illustration in this regard is shown in FIG. 4A and FIG. 4B. Here, it can be seen that different light intensity patterns 124(n) are generated for different excitations 400 according to the plurality of light beams 120(n±1) for two mutually different multimode optical waveguides (with the light intensity patterns 402 of a first multimode optical waveguide in FIG. 4A and the light intensity patterns 404 of a second multimode optical waveguide different from the first multimode optical waveguide in FIG. 4B).

It is understood that both of the transmission characteristics and the light intensity pattern can also be stored as a target representation.

(Ib) Representation 126 for Integrity Check

According to various embodiments, an initial transmission signature may be stored as a destination representation in the memory 150(n) (e.g., generated as described with reference to (Ia)).

In this case, the processor 114(n) may be configured to compare the determined representation 126 with the stored target representation. For example, the representation 126 determined to be the transmission signature may be compared to the stored transmission signature. For example, the stored transmission signature may have the determined transmission characteristics (e.g., the determined transmission matrix) and the processor 114(s) may determine the transmission characteristics as a representation 126 and compare it to the stored transmission characteristics. For example, the stored transmission signature may have a stored light intensity pattern and the processor 114(n) may compare the light intensity pattern 124(n) determined as a representation 126 to the stored light intensity pattern.

The plurality of light beams 120(n±1) transmitted from the respective other chip 102(n±1) may represent data. The processor 114(n) may be configured to confirm the integrity of this data if the representation 126 matches the target representation.

Illustratively, according to various embodiments, the mode distribution may serve as a transmission signature (also referred to in some aspects as a fingerprint). For example, this makes it more difficult (e.g., prevented) to eavesdrop on the transmission channel, as changes to the transmission channel (e.g., a coupling and/or decoupling of light) can be detected. Illustratively, an integrity check is provided since manipulated (e.g., compromised) data can be detected, a confidentiality check is provided since eavesdropping on the transmission channel (i.e., the multimode optical waveguide 106) can be detected.

(ii) Representation 126 as a Cryptographic Key.

As described, the transmission characteristics of a multimode optical waveguide are reciprocal. According to various embodiments, therefore, the first chip 102(1) and the second chip 102(2) may determine the same transmission characteristics for detected light intensity patterns. According to various embodiments, the first chip 102(1) may transmit the first plurality of light beams 120(1) to the second chip 102(2) and the second chip 102(2) may detect them as a first light intensity pattern 124(1). The second chip 102(2) may transmit the second plurality of light beams 120(2) (referred to in some aspects as second light beams) to the first chip 102(1), and the first chip 102(1) may detect them as a second light intensity pattern 124(2). Here, each light beam of the first plurality of light beams 120(1) may have a light beam of the second plurality of light beams 120(2) associated therewith, and the light beam may have the same wavelength as the associated light beam. Since the transmission characteristics of the multimode optical waveguide 106 are wavelength dependent, this results in the first light intensity pattern 124(1) corresponding to the second light intensity pattern 124(2). Optionally, the light beam may have the same amplitude as the associated light beam. Alternatively, the amplitudes of the respective associated light beams may be different from each other, in which case the respective processor 114($n$) may be configured to normalize the respective detected light intensity pattern 124($n$). This results in the normalized first light intensity pattern 124(1) corresponding to the normalized second light intensity pattern 124(2) even if the amplitudes are different.

According to various embodiments, each processor 114($n$) may be configured to determine a cryptographic key as a representation 126 based on the detected light intensity pattern 124($n$) and/or based on the determined transmission properties (e.g., the determined transmission matrix). Consequently, since the transmission characteristics are reciprocal and the detected light intensity patterns 124(1), 124(2) may correspond to each other, the first processor 114(1) and the second processor 114(2) may determine (e.g., generate) the same cryptographic key without requiring any type of additional key exchange. Illustratively, symmetric key generation (also referred to as key generation) is provided.

Figure 2A:
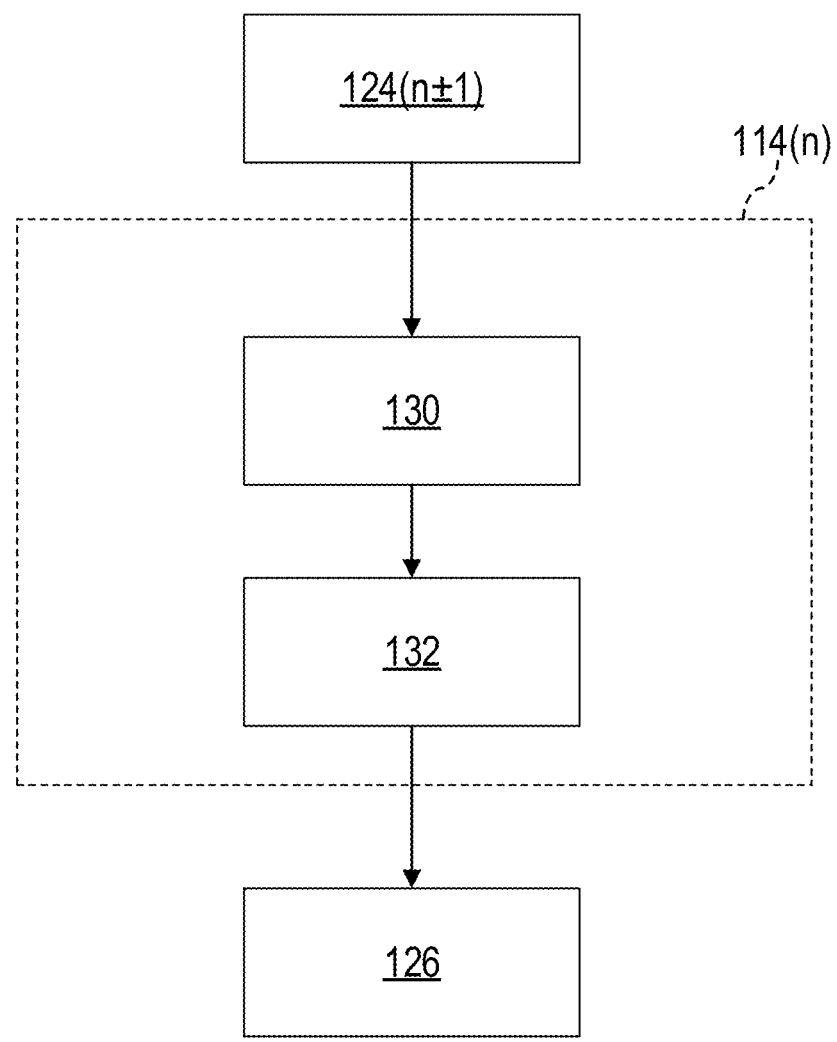
FIGS. 2A to 3C depict a flowchart for determining a cryptographic key according to various embodiments.
Figure 2B:
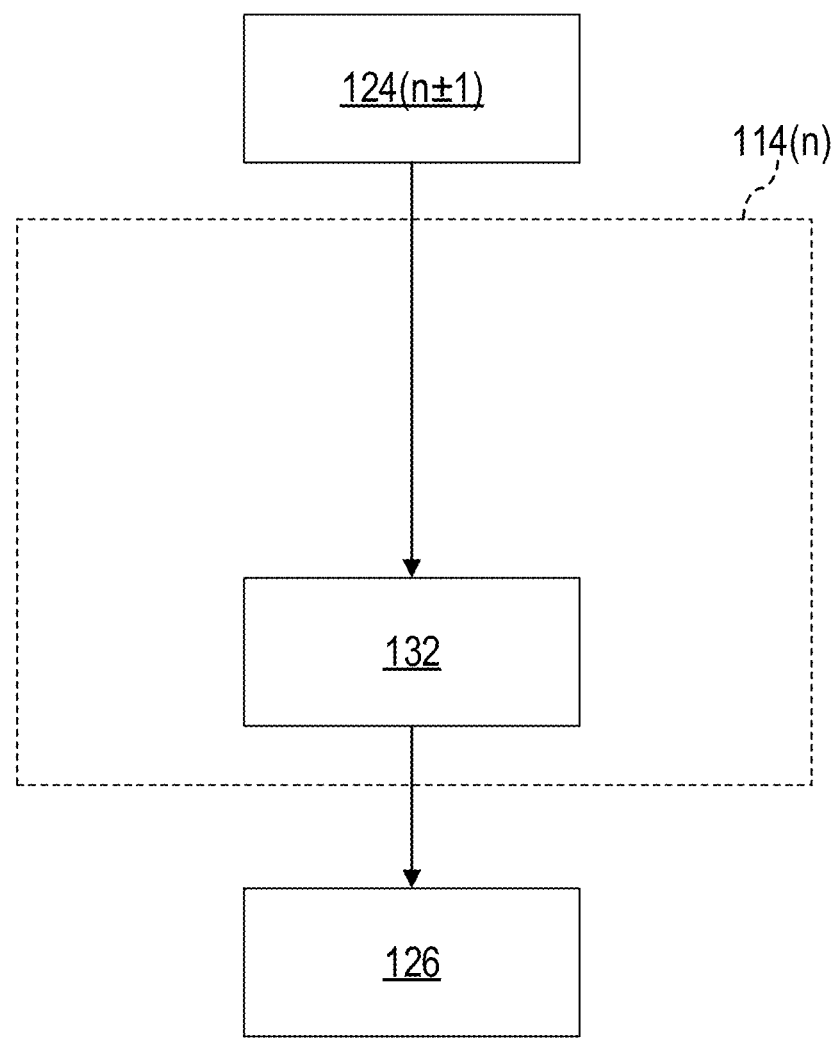
Figure 2C:
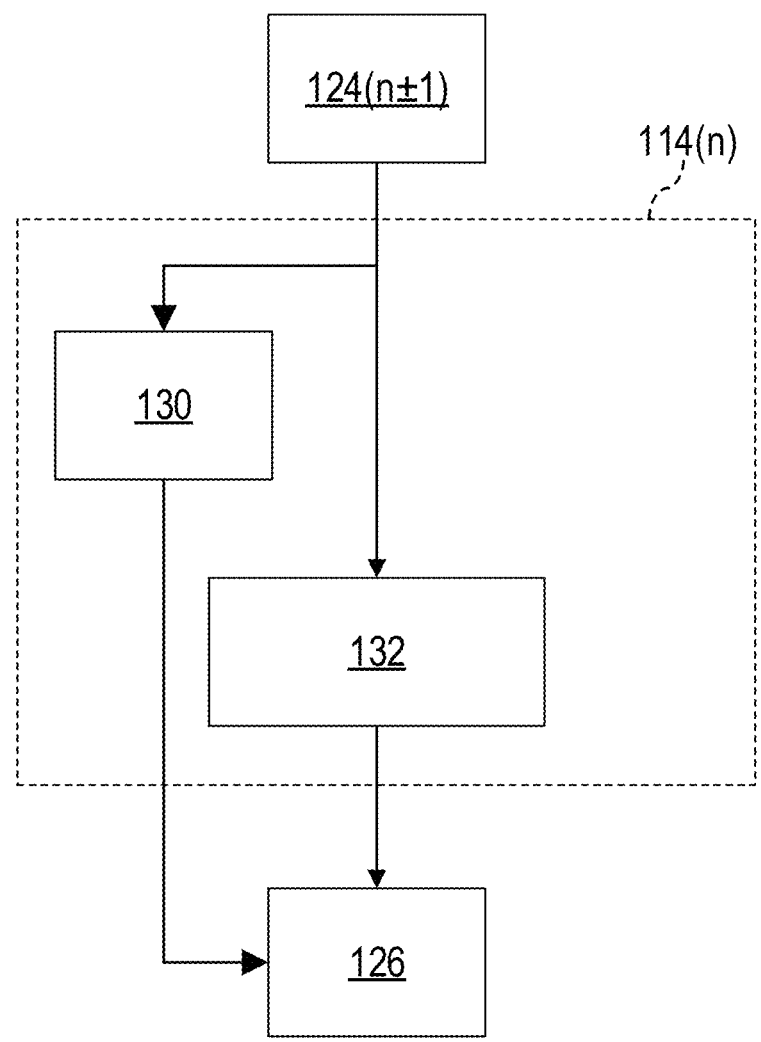

Example flowcharts for generating the cryptographic key are shown in FIG. 2A through FIG. 2C. According to various embodiments, each processor 114($n$) may implement an encryption algorithm 132. One of the memories of the at least one associated memory may be configured to store code (e.g., program code) to implement the encryption algorithm 132.

The processor 114($n$) may be configured to determine transmission characteristics 130 based on the detected light intensity pattern 124($n$±1). The encryption algorithm 132 may be configured to generate the cryptographic key based on the determined transmission characteristics 130 (see, e.g., FIG. 2A). The encryption algorithm 132 may be configured to generate the cryptographic key directly based on the detected light intensity pattern 124($n$±1) (see, e.g., FIG. 2B). The encryption algorithm 132 may be configured to generate the cryptographic key based on the detected transmission characteristics 130 and based on the detected light intensity pattern 124($n$±1) (see, e.g., FIG. 2C).

For the circumstances and/or conditions under which an update of the generated cryptographic key is allowed, conventional circumstances and/or conditions can be used. In principle, the cryptographic key can be generated again at any time.

It will be understood the representation 126 may have both the transmission signature and the cryptographic key (e.g., to ensure the integrity of the data and the confidentiality of the data). Thus, both the integrity and confidentiality of the data can be verified by comparing the representation 126 with the stored transmission signature, and the confidentiality can be additionally enhanced by encrypting the transmitted data using the cryptographic key.

Figure 1F:
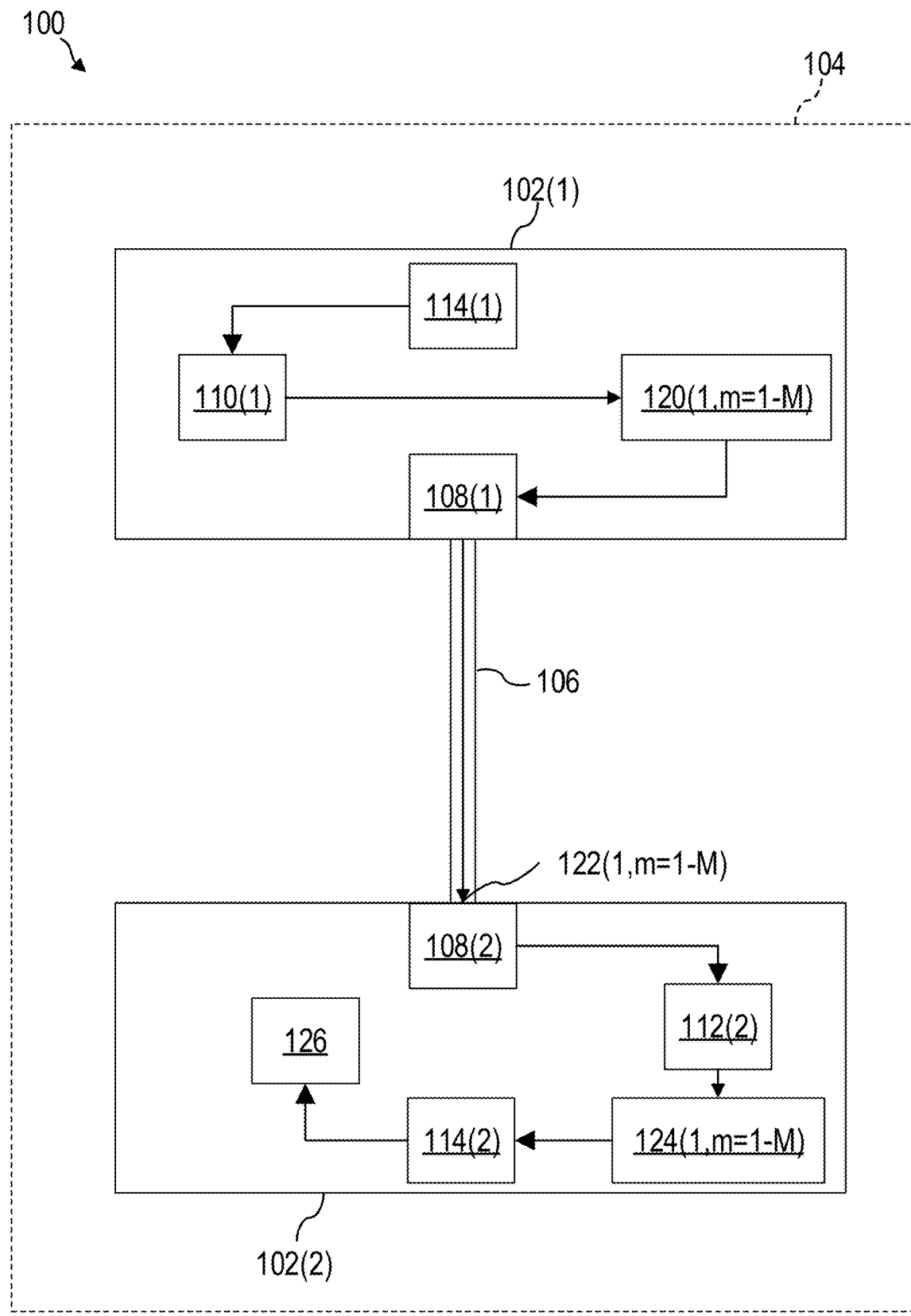

As described herein, the transmission characteristics of the multimode optical waveguide 106 are wavelength dependent. According to various embodiments, wavelength multiplexing may be performed. This is shown in FIG. 1F. Thus, for each wavelength (m) of multiple wavelengths (m=1 to M), a respective plurality of light beams 120($n$, m=1 to M) may be transmitted from one chip 102($n$) to the other chip 102($n$±1), and for each wavelength (m), a respective light intensity pattern 124($n$, m) may be detected by the other chip 102($n$±1). "M" may be any integer greater than or equal to one.

Each light intensity pattern 124($n$, m) may serve as an initial transmission signature (and thus, for example, a target representation) or for comparison with an initial transmission signature. The processor 114($n$) may be configured to determine respective transmission characteristics for each light intensity pattern 124($n$, m) and thus for each wavelength (m) of the plurality of wavelengths (m=1 to M). The respective transmission characteristics may serve as respective transmission signatures. Illustratively, respective transmission signatures may be or may be stored for one or more wavelengths (m).

Figure 3A:
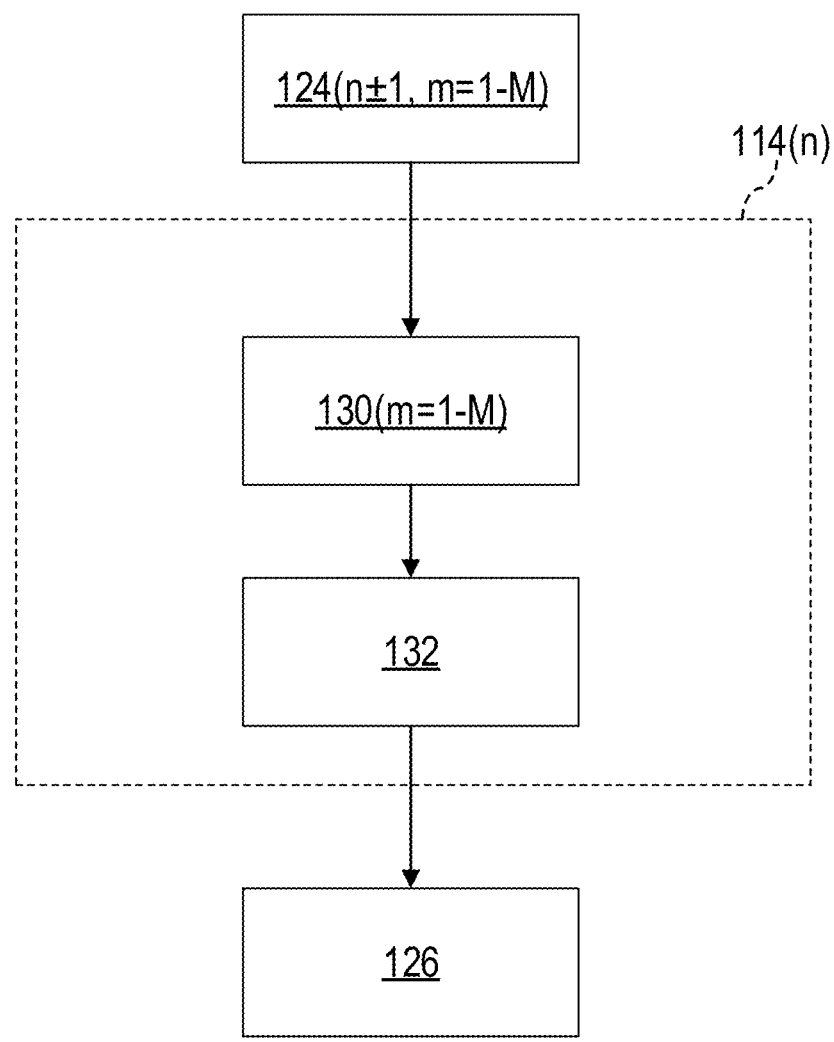
Figure 3B:
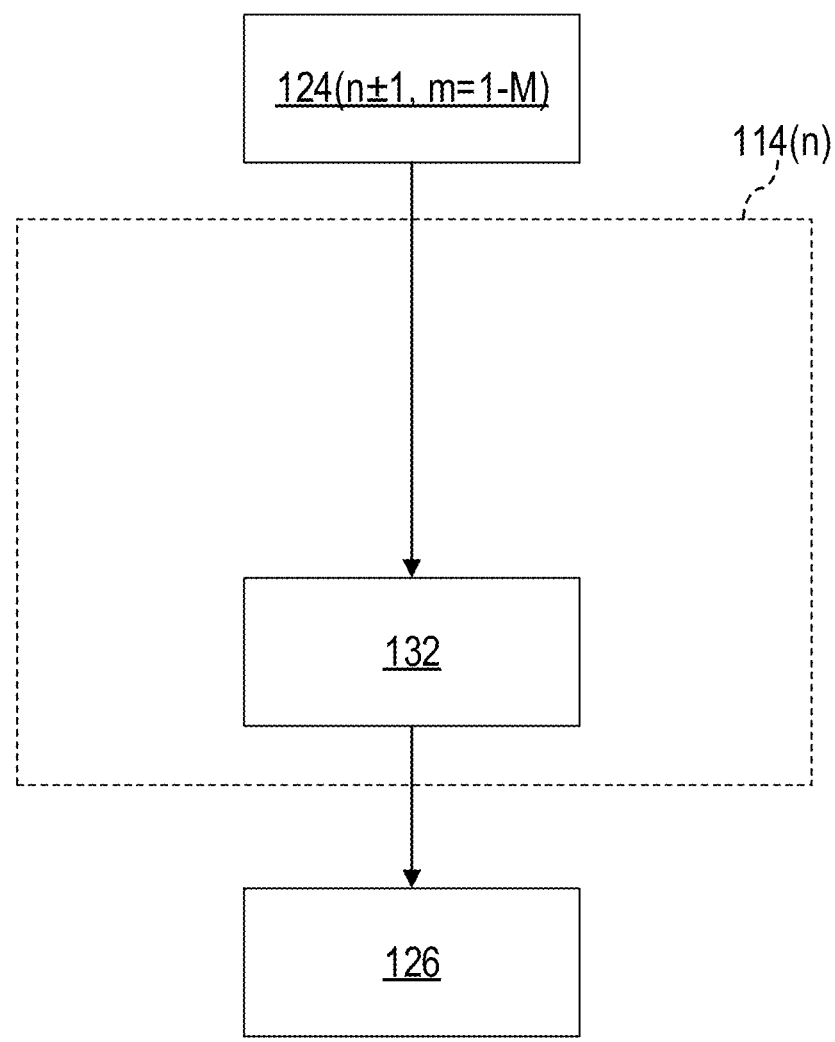
Figure 3C:
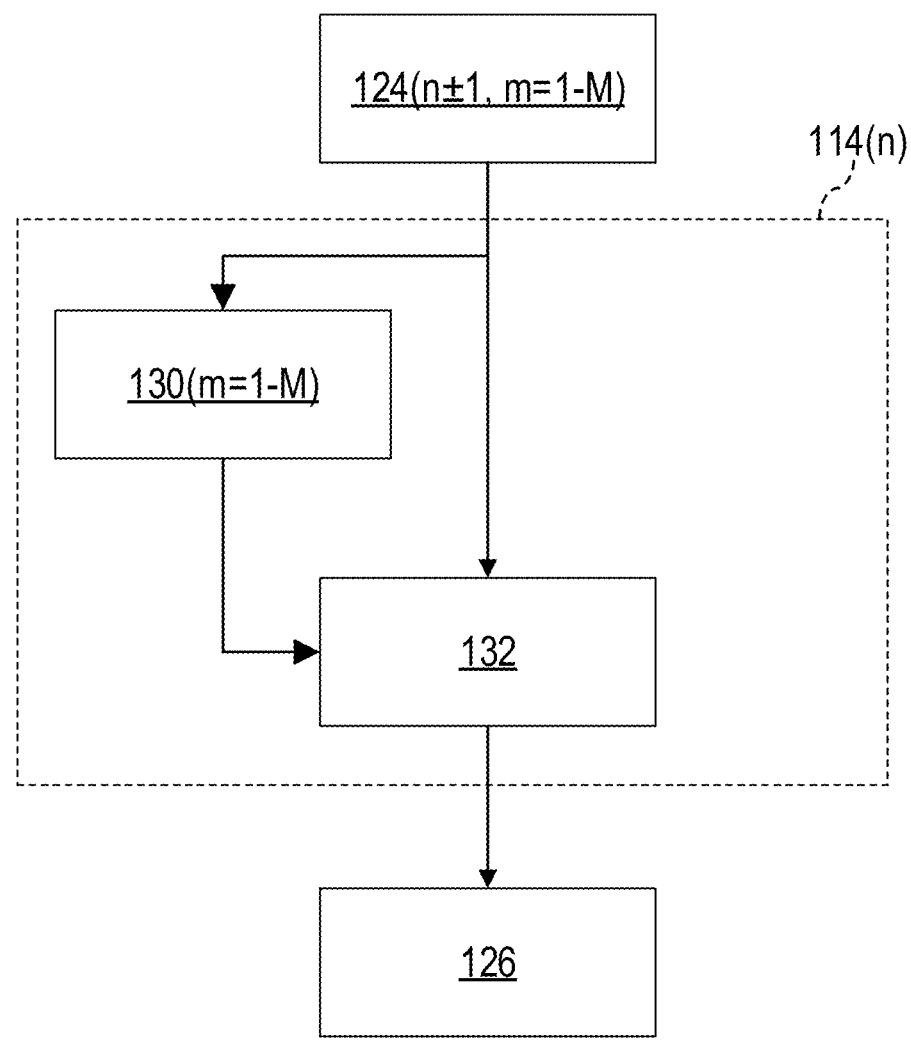

With reference to FIG. 3A to FIG. 3C, the processor 114($n$) may be configured to determine the cryptographic key using wavelength division multiplexing. This may further increase a complexity of the cryptographic key and thus security. The encryption algorithm 132 may be configured to generate the cryptographic key using the transmission characteristics 130(m=1 to M) determined for all wavelengths (see, e.g., FIG. 3A). The encryption algorithm 132 may be configured to generate the cryptographic key directly based on the light intensity patterns 124($n$±1, m=1 to M) detected for all wavelengths (m=1 to M) (see, e.g., FIG. 3B). The encryption algorithm 132 may be configured to generate the cryptographic key based on the transmission characteristics 130(m=1 to M) detected for all wavelengths (m=1 to M) and based on the light intensity patterns 124($n$±1, m=1 to M) detected for all wavelengths (see, e.g., FIG. 3C).

Figure 1G:
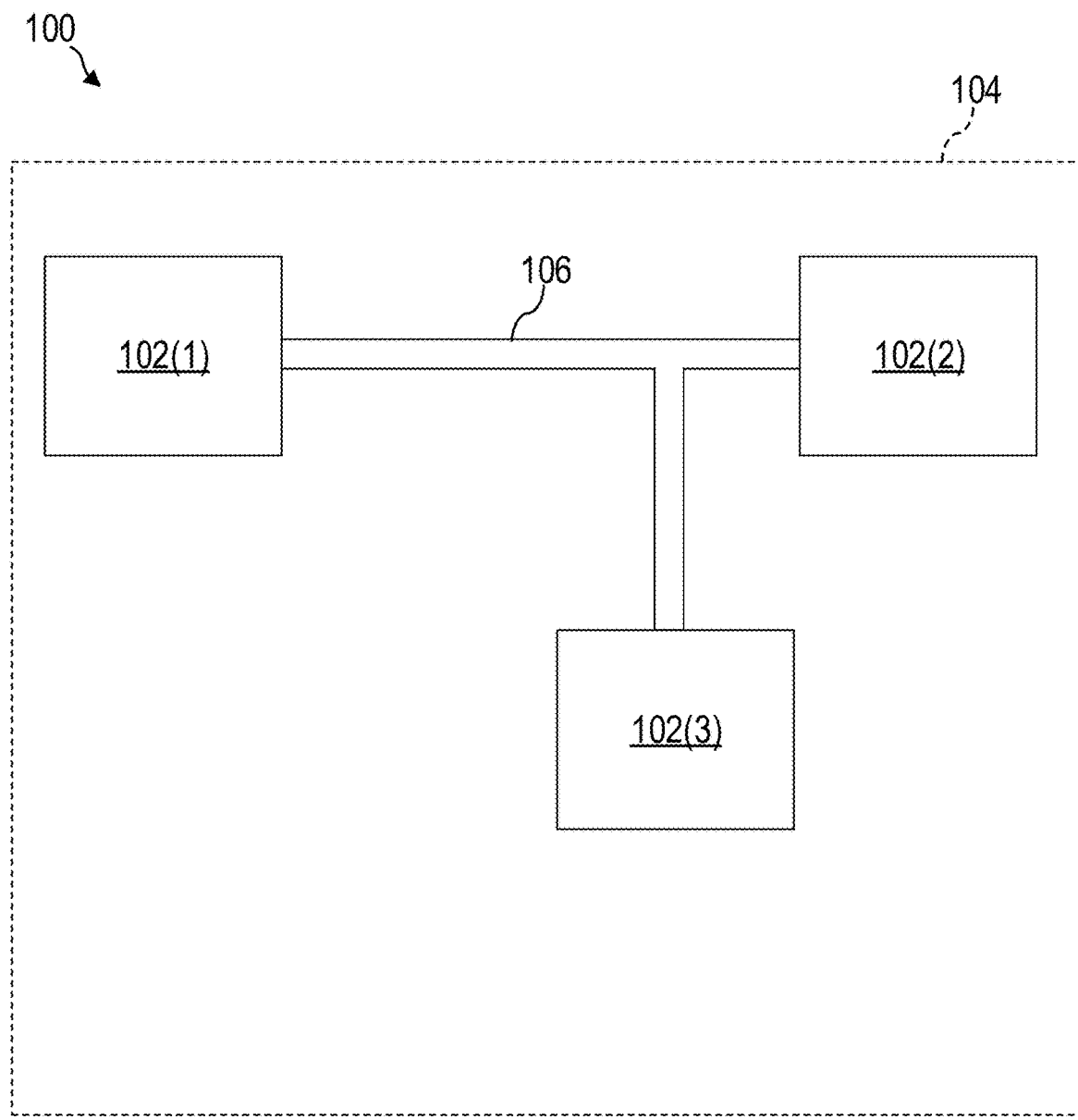
Figure 5:
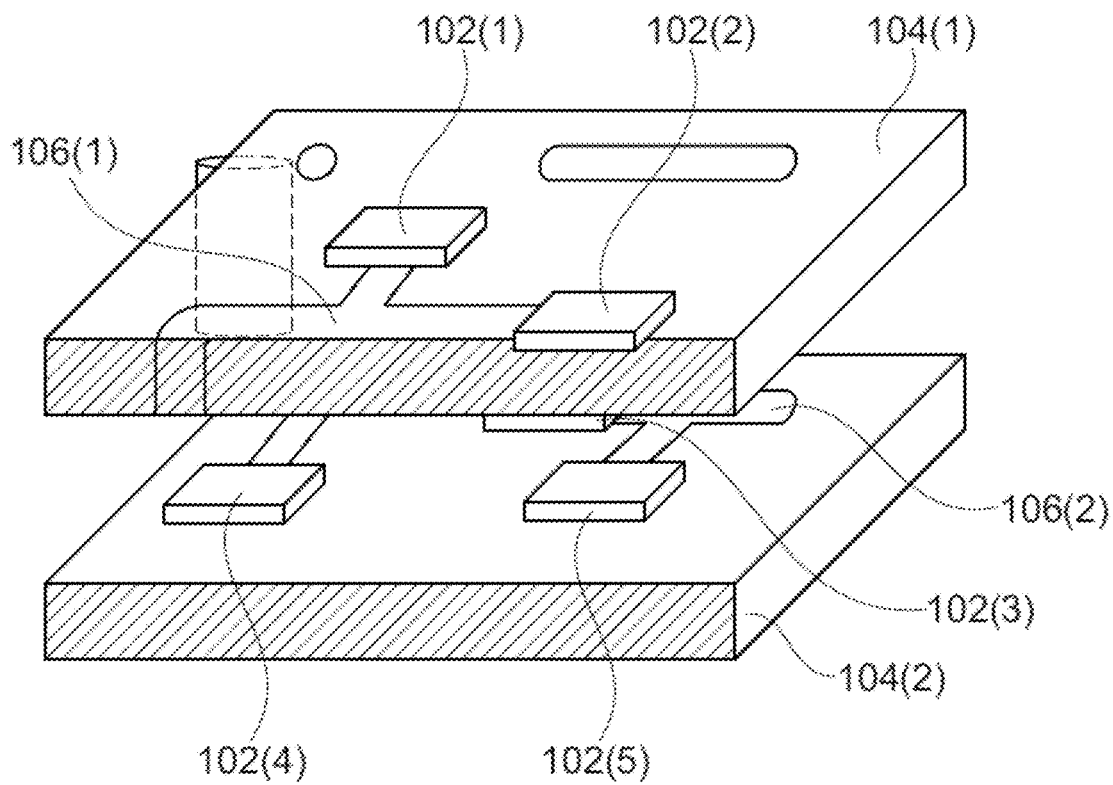
FIG. 5 depicts an exemplary multi-chip module according to various embodiments.

According to various embodiments, more than two chips 102($n$=2 to N) may be coupled (e.g., communicatively connected) using the multimode optical waveguide 106. Illustratively, in various embodiments, "N" may be greater than or equal to three. An example of this is shown in FIG. 1G. Another example is shown in FIG. 5, wherein a first chip 102($n$=1), a second chip 102($n$=2), and a third chip 102($n$=3) are arranged on a first carrier 104(1) (e.g. a first interposer) and coupled by means of a first waveguide 106(1), and wherein a fourth chip 102($n$=4) and a fifth chip 102($n$=5) are arranged on a second carrier 104(2) (e.g., a second interposer) and coupled by means of a second waveguide 106(2).

As described in detail herein, the transmission characteristics and thus the mode mixing are site-variant. Therefore, the transmission characteristics between any two chips are individual. For example, the mode mixing for transmission between the first chip 102(1) and the second chip 102(2) is different from the mode mixing for transmission between the first chip 102(1) and the third chip 102(3), and these are also different from transmission between the second chip 102(2) and the third chip 102(3).

Thus, for each communication between two of the chips, an individual transmission signature may be generated, an individual transmission signature may be or will be stored, and/or an individual cryptographic key may be generated. For example, the first chip 102(1) may check whether data is being sent from the second chip 102(2) or the third chip 102(3) based on the transmission signature stored in the at least one first memory 150(1). For example, although the first chip 102(1) may receive mixed light beams emitted by one of the two chips 102(2), 102(3) for encrypted communication between the second chip 102(2) and the third chip 102(3), the first chip 102(1) may not know the (e.g., symmetric) cryptographic key of the second chip 102(2) and third chip 102(3). Also, even if the first chip 102(1) knows both the transmission characteristics for communication between the first chip 102(1) and the second chip 102(2) and the transmission characteristics for communication between the first chip 102(1) and the third chip 102(3) (e.g., as a destination representation), the first chip 102(1) cannot compute the transmission characteristics for communication between the second chip 102(2) and the third chip 102(3). It is understood that this may apply analogously to the other chips in any combination.

Illustratively, confidentiality of data can be provided in such a manner even when more than two chips are coupled together using the same multimode optical waveguide. As described above, it is understood that the each of the chips 102(1), 102(2), 102(3) described herein may also be another component, such as a memory, sensor, processor, or other component of a multi-chip module.

Figure 6A:
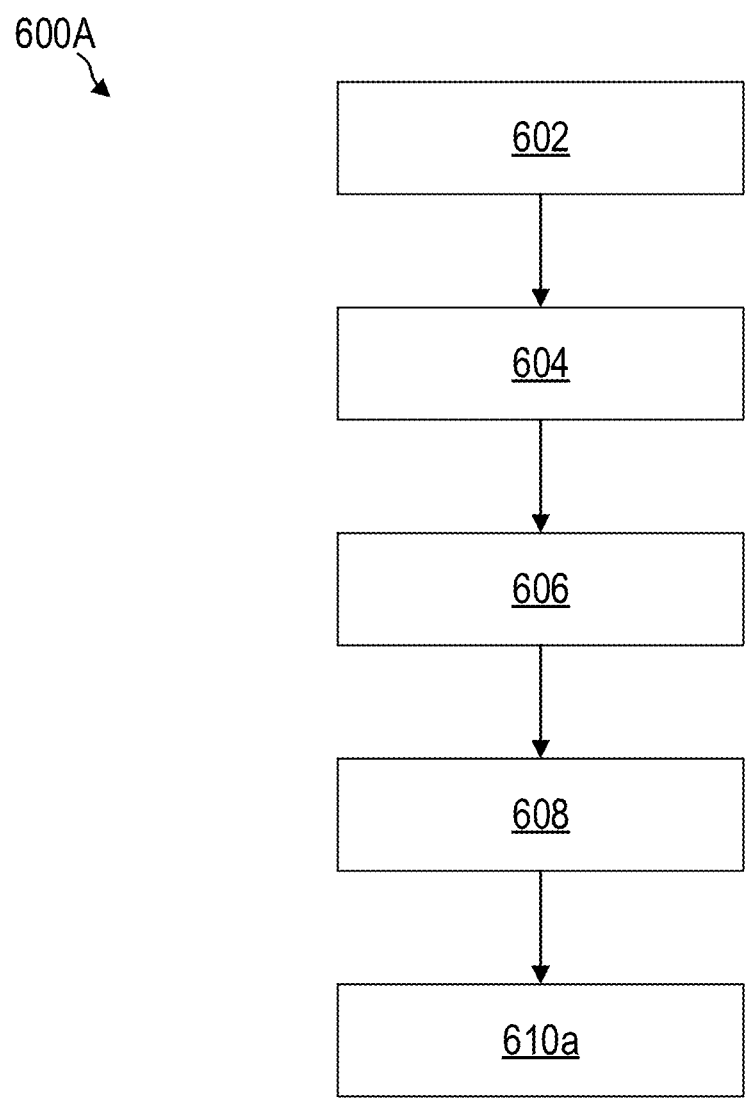

FIG. 6A and FIG. 6B each show a flowchart of a method 600A, 600B according to various embodiments.

For example, the method 600A may be a method for generating a transmission signature and/or a cryptographic key.

For example, the method 600B may be a method for checking integrity of the received data.

The respective method 600A, 600B may include transmitting a plurality of (e.g., multimode) light beams from a first chip into a multimode optical waveguide (in 602). The multimode optical waveguide may be disposed (e.g., formed) in and/or on a carrier.

The respective method 600A, 600B may include generating a plurality of mixed light beams by the multimode optical waveguide (in 604). The plurality of mixed light beams may be an at least partial superposition of the plurality of (multimode) light beams. Illustratively, the method may include mixing (e.g., mode mixing) the plurality of (multimode) light beams through the multimode optical waveguide.

The respective method 600A, 600B may include receiving the plurality of mixed light beams by the second chip (in 606).

The first chip and the second chip may be located on the carrier.

The respective method 600A, 600B may include determining a representation of the received plurality of mixed light beams (in 608).

The determined representation may have or be a (e.g., initial) transmission signature and/or a cryptographic key. Illustratively, determining the representation (in 608) may involve determining a transmission signature and/or a cryptographic key. The method 600A may include storing the determined representation (e.g., the transmission signature and/or the cryptographic key) in a memory associated with the second chip (in 610a). Optionally, the method 600A may further include encrypting data using the determined cryptographic key. Optionally, the method 600A may further include transmitting the encrypted data to the first chip. Optionally, the method 600A may include receiving, by the second chip, data transmitted from the first chip and verifying an integrity of the received data by the second chip using the transmission signature stored in the memory.

According to various embodiments, the memory associated with the second chip may store a transmission signature as a target representation. The method 600B may include comparing the determined representation with the target representation (in 610b). Optionally, the method 600B may include confirming the integrity of data representing the plurality of light beams if the determined representation matches the target representation.

It will be understood that aspects described with reference to the multi-chip module 100 may also be embodied as a method, and vice versa.

The invention claimed is:

1. A multi-chip module, comprising:
    a carrier;
    a multimode optical waveguide formed on the carrier, in the carrier, or on and in the carrier;
    a first chip and a second chip disposed on the carrier and coupled to the multimode optical waveguide;
    wherein the first chip is configured to transmit a plurality of light beams into the multimode optical waveguide;
    wherein the multimode optical waveguide is configured to generate a plurality of mixed light beams having at least partial superposition of the plurality of light beams;
    wherein the second chip is configured to receive the plurality of mixed light beams from the multimode optical waveguide; and
    where the second chip is configured to:
        store a representation of the received plurality of mixed light beams as a transmission signature and/or as a cryptographic key in a memory associated with the second chip, and/or
        compare the representation of the received plurality of mixed light beams with a target representation stored in the memory associated with the second chip.

2. The multi-chip module according to claim 1, wherein each light beam of the plurality of light beams has an associated light mode of a plurality of light modes.

3. The multi-chip module according to claim 1, wherein the second chip is configured to confirm integrity of data represented by the plurality of light beams if the representation of the received plurality of mixed light beams corresponds to the target representation.

4. The multi-chip module according to claim 1, where the second chip is configured to:
    determine transmission characteristics of the multimode optical waveguide as the representation of the received plurality of mixed light beams using the received plurality of mixed light beams; and/or
    detect the received plurality of mixed light beams as a light intensity pattern, wherein the detected light intensity pattern is the representation of the received plurality of mixed light beams.

5. The multi-chip module according to claim 1, wherein the first chip is configured to transmit a respective plurality of light beams into the multimode optical waveguide for each wavelength of a plurality of wavelengths;
wherein, for each wavelength of the plurality of wavelengths, the second chip is configured to:

receive a respective plurality of mixed light beams from the multimode optical waveguide; and store a respective representation or a common representation of the received plurality of mixed light beams and/or compare it to a respective or common target representation.

6. The multi-chip module according to claim 5, wherein the second chip is configured to determine, for each received plurality of mixed light beams, respective transmission characteristics of the multimode optical waveguide of the received plurality of mixed light beams; wherein the respective transmission characteristics are the respective representation of the received plurality of mixed light beams, or wherein the representation is determined using each of the determined transmission characteristics.

7. The multi-chip module according to claim 5, wherein the second chip is configured to detect, for each received plurality of mixed light beams, a respective light intensity pattern which is the respective representation of the received plurality of mixed light beams, or wherein the representation is determined using the light intensity patterns.

8. The multi-chip module according to claim 1, wherein the plurality of light beams is a first plurality of light beams, and wherein the plurality of mixed light beams is a first plurality of mixed light beams;

wherein the second chip is configured to transmit a second plurality of light beams into the multimode optical waveguide;

wherein the multimode optical waveguide is configured to generate a second plurality of mixed light beams comprising an at least partial superposition of the second plurality of light beams;

wherein the first chip is configured to receive the second plurality of mixed light beams from the multimode optical waveguide; and wherein the first chip is configured to store a representation of the received second plurality of mixed light beams in a memory associated with the first chip.

9. The multi-chip module according to claim 8, wherein each light beam of the second plurality of light beams is associated with a light beam of the first plurality of light beams and has the same wavelength as the associated light beam;

wherein the second chip is configured to determine, using the received first plurality of mixed light beams, the cryptographic key as a representation of the received first plurality of mixed light beams; and wherein the first chip is configured to determine the cryptographic key as a representation of the received second plurality of mixed light beams using the received second plurality of mixed light beams.

10. The multi-chip module according to claim 9, wherein the second chip is configured to determine transmission characteristics of the multimode optical waveguide using the received first plurality of mixed light beams and to determine the cryptographic key using the determined transmission characteristics; and wherein the first chip is configured to determine the transmission characteristics of the multimode optical waveguide using the received second plurality of mixed light beams and to determine the cryptographic key using the determined transmission characteristics; and/or wherein the second chip is configured to detect the received first plurality of mixed light beams as a first light intensity pattern and to determine the cryptographic key using the detected first light intensity pattern; and wherein the first chip is configured to detect the received second plurality of mixed light beams as a second light intensity pattern and to determine the cryptographic key using the detected second light intensity pattern.

11. The multi-chip module according to claim 9, wherein the first chip is configured to transmit, for each wavelength of the plurality of wavelengths, a respective first plurality of light beams into the multimode optical waveguide, wherein the second chip is configured to receive, for each wavelength of the plurality of wavelengths, a respective first plurality of mixed light beams from the multimode optical waveguide and to determine the cryptographic key using each received first plurality of mixed light beams; and wherein the second chip is configured to transmit, for each wavelength of the plurality of wavelengths, a respective second plurality of light beams into the multimode optical waveguide, wherein the first chip is configured to receive, for each wavelength of the plurality of wavelengths, a respective second plurality of mixed light beams from the multimode optical waveguide and to determine the cryptographic key using each received second plurality of mixed light beams.

12. The multi-chip module according to claim 11, wherein the second chip is configured to determine, for each received first plurality of mixed light beams, respective transmission characteristics of the multimode optical waveguide and to determine the cryptographic key using all of the determined transmission characteristics; and wherein the first chip is configured to determine, for each received second plurality of mixed light beams, the respective transmission characteristics of the multimode optical waveguide and to determine the cryptographic key using all of the determined transmission characteristics; and/or wherein the second chip is configured to detect a respective first light intensity pattern for each received first plurality of mixed light beams and to determine the cryptographic key using the detected first light intensity patterns; and wherein the first chip is configured to detect a respective second light intensity pattern for each received second plurality of mixed light beams and to determine the cryptographic key using the detected second light intensity patterns.

13. The multi-chip module according to claim 1, wherein the first chip is configured to encrypt data by means of the determined cryptographic key;

wherein the first chip is configured to transmit the encrypted data to the second chip by means of the multimode optical waveguide; and/or wherein the second chip is configured to encrypt data by means of the determined cryptographic key, the second chip being configured to transmit the encrypted data to the first chip by means of the multimode optical waveguide.

14. A method, comprising:

transmitting a plurality of light beams from a first chip into a multimode optical waveguide formed on and/or in a carrier;

generating a plurality of mixed light beams, which has at least partial superposition of the plurality of light beams, by the multimode optical waveguide;

Receiving the plurality of mixed light beams by the second chip, wherein the first chip and the second chip are disposed on a carrier;

determining a representation of the received plurality of mixed light beams; and storing the representation of the received plurality of mixed light beams as a transmission signature and/or as a cryptographic key in a memory associated with the second chip;

and/or comparing the representation of the received plurality of mixed light beams with a target representation stored in the memory associated with the second chip.

15. The method according to claim 14, wherein determining the representation of the received plurality of mixed light beams comprises:

determining transmission characteristics of the multi-mode optical waveguide using the received plurality of mixed light beams, and/or detecting the received plurality of mixed light beams as a light intensity pattern, wherein the detected light intensity pattern is the representation of the received plurality of mixed light beams, and/or Determining the cryptographic key by the second chip using the received plurality of mixed light beams.

* * * * *